… …

3,055,916
2-HALO-Δ² ANDROSTEN DERIVATIVES AND PROCESS

Albert Bowers, John Edwards, and James C. Orr, Mexico City, Mexico, assignors, by mesne assignments, to Syntex Corporation, a corporation of Panama
No Drawing. Filed Oct. 20, 1961, Ser. No. 146,454
26 Claims. (Cl. 260—397.3)

The present invention relates to novel cyclopentanophenanthrene derivatives and to a process for the production thereof.

More particularly the present invention relates to 2-halo-Δ²-androsten derivatives.

The novel compounds of the present invention are represented by the following formulas:

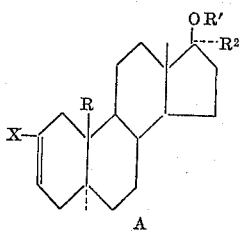

In the above formulas X represents fluorine, chlorine or bromine; R represents hydrogen or methyl; $R^1$ represents hydrogen or a hydrocarbon carboxylic acyl group of less than 12 carbon atoms; $R^2$ represents hydrogen or a lower alkyl, alkenyl or alkinyl group such as for example methyl, ethyl, propyl, butyl, vinyl, propenyl, butenyl, ethinyl, propargyl and butinyl.

The compounds represented by the above formulas are anabolic-androgenic agents with a favorable anabolic to androgenic ratio. They also are anti-estrogenic, anti-gonadotrophic, anti-fibrillatory and central nervous system depressant compounds. In addition they lower the blood cholesterol level, relieve pre-menstrual tensions and suppress the output of the pituitary gland.

The compounds represented by the above formula A wherein $R^2$ is a lower alkenyl or alkinyl group are also progestational agents with high oral activity. They also are anti-estrogenic, lower the blood cholesterol level and have anti-aldosterone activity.

Some novel important intermediates in the production of the final products mentioned above are 2,2-difluoro-androstan-17β-ol-3-one, 2,2-difluoro-19-nor-androstan-17β-ol-3-one, 2,2-difluoro-19-nor-androstan-3β,17β-diol and 2,2-difluoro-androstan-3β,17β-diol.

The novel 2-fluoro-17α-unsubstituted compounds of the present invention are prepared by the process exemplified by the following equation:

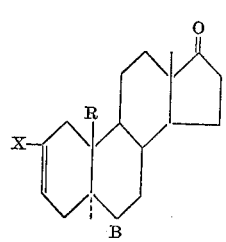

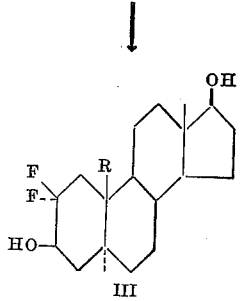

In the above Example R has the same meaning as previously set forth.

In practicing the process just outlined, the starting compound which is 2α-fluoro-androstan-17β-ol-3-one or the 19-nor derivative thereof (I), is treated with pyrrolidine in a suitable solvent such as benzene thus furnishing the corresponding 3-pyrrolidino-2-fluoro-Δ²-androsten-17β-ol compound which upon reaction with perchloryl fluoride in a suitable solvent, preferably benzene, affords the corresponding 2,2-difluoro-androstan-17β-al-3-one derivative (II).

Reduction of the last named compound preferably with sodium borohydride furnishes the corresponding 2,2-difluoro-androstane-3β,17β-diol compound (III) which upon treatment with a suitable agent such as chromous chloride solution or zinc in ethanol furnishes the respective 2-fluoro-Δ²-androsten-17β-ol (IV). Oxidation of this compound with an oxidizing agent such as chromium trioxide in pyridine furnishes the 2-fluoro-Δ²-androsten-17-one or the 19-nor-derivative thereof (V).

The novel 2-bromo-17α-unsubstituted compounds of the present invention are prepared by the process illustrated by the following equation:

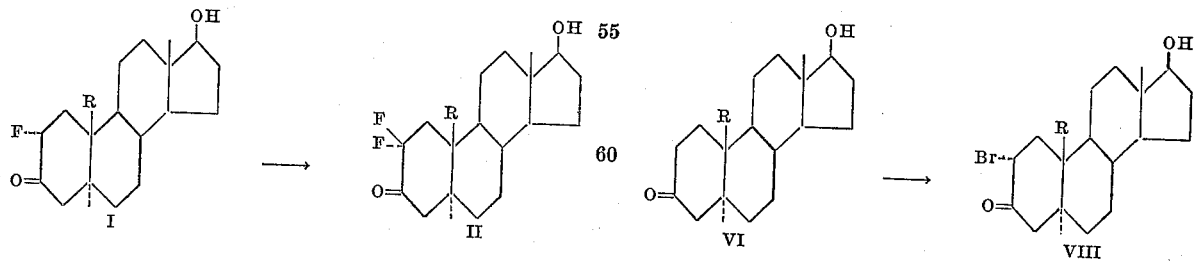

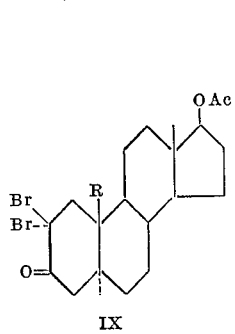
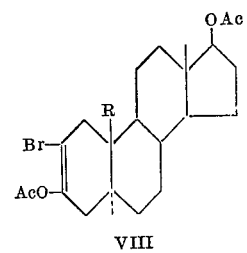
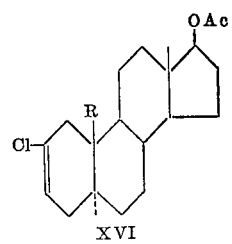

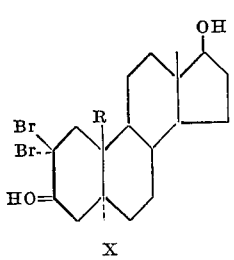
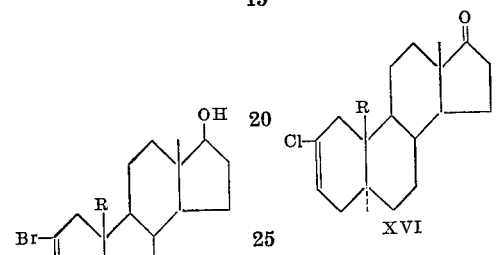
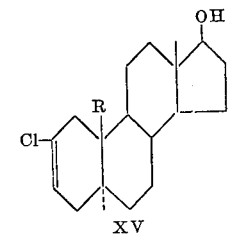

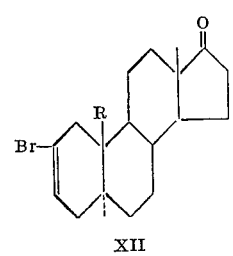

In the above formulas R has the same meaning as heretofore set forth.

In practicing the above outlined process, the starting compound which is androstan-17β-ol-2-one acetate or the 19-nor derivative thereof (XIII) is treated with phosphorus pentachloride in an inert solvent such as carbon tetrachloride at reflux temperature for a period of time of the order of 2 hours, thus affording the corresponding 2-chloro-Δ²-androsten - 17β - ol - 17 - acetate (XIV). Conventional saponification of this compound furnishes the free 17β-alcohol (XV) which upon oxidation affords the corresponding 2-chloro-Δ²-androsten-17-one.

The 2-halo-17α-substituted compounds of the present invention are prepared by the process illustrated by the following equation:

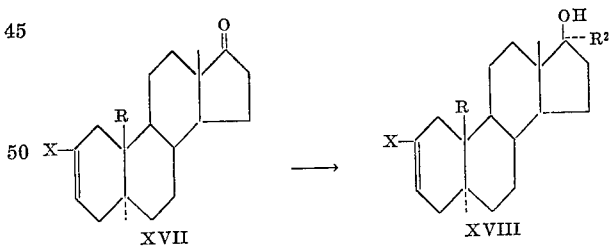

In the above formulas X, R and R² have the same meaning as previously set forth.

In practicing the process just outlined, the starting 2-halo-Δ²-androsten-17-one compound (XVII) is treated with an alkinyl, alkenyl or alkyl magnesium halide as for example methyl magnesium promide, vinyl magnesium bromide or ethynyl magnesium bromide, thus furnishing the corresponding 17α-alkyl, alkenyl or alkynyl derivatives (XVIII).

In the above formulas R has the same meaning as heretofore set forth.

In practicing the process outlined above the starting androstan-17β-ol-3-one or the 19-nor derivative thereof (VI) is brominated with 1.1 mol equivalents of bromine in the presence of hydrogen bromide, affording the corresponding 2α-bromo-3-keto derivative (VII). Treatment of this compound with isopropenyl acetate in the presence of p-toluenesulfonic acid at reflux temperature furnishes the respective 2-bromo-3,17β-diacetoxy-Δ²-androstene derivative (VIII). Bromination of this compound with bromine in a suitably buffered solution, preferably an acetic acid-carbontetrachloride-sodium acetate mixture, affords the corresponding 2,2-dibromo-17β-acetoxy-androstan-3-one (IX), which upon reduction with a suitable agent, such as sodium borohydride in a moisture containing solution, furnishes the respective 2,2-dibromo-androstane-3β,17β-diol (X).

Treatment of this latter compound with a suitable agent such as a chromous chloride solution or zinc in ethanol gives the 2-bromo-Δ²-androsten-17β-ol or the 19-nor derivative thereof (XI), which upon oxidation with, for example, chromium trioxide in pyridine, yield the corresponding 17-ketone (XII).

The 2-chloro-17α-unsubstituted compounds of the present invention may be prepared by the process exemplified by the following equation:

The heretofore described secondary alcohols (IV, XI, XV) are conventionally acylated in pyridine with an acylating agent, as for example acetic anhydride or caproic anhydride affording the corresponding acylates.

The tertiary alcohols (XVIII) are conventionally acylated in the presence of p-toluenesulfonic acid with an excess of an acylating agent, as for example an anhydride of a hydrocarbon carboxylic acid of the type described hereinabove, thus furnishing the corresponding 17β-acyloxy compounds.

The following specific examples serve to illustrate but are not intended to limit the scope of the present invention:

Example I

A mixture of 3 g. of 2α-fluoro-androstan-17β-ol-3-one. [Edwards and Ringold, J. Am. Chem. Soc. 81, 5262, (1959)], 50 cc. of thiophene-free benzene and 4 mol equivalents of pyrrolidine was refluxed with a water separator until no more water separated. The resulting mixture was evaporated to dryness and the residue recrystallized from chloroform-methanol affording 3-pyrrolidino-2-fluoro-Δ²-androsten-17β-ol.

3 g. of the above pyrrolidino compound were dissolved in 900 ml. of dry thiophene-free benzene and perchloryl fluoride was bubbled into the solution for 1 minute. After washing successively with saturated sodium bicarbonate solution and water, the benzene solution was dried and evaporated to dryness under reduced pressure. The residue was taken up in 100 ml. of a 1:1 mixture of benzene and petroleum ether. This solution was filtered through 10 g. of Florisil and the filtrate evaporated to dryness in vacuo. Recrystallization of the residue from acetone-hexane afforded 2,2-difluoro-androstan-17β-ol-3-one.

Following the same procedure, there was treated 2α-fluoro-19-nor-androstan-17β-ol-3-one [prepared by the general method described by Edwards and Ringold, J. Am. Chem. Soc. 81, 5262, (1959)], furnishing 2,2-difluoro-19-nor-androstan-17β-ol-3-one.

Example II

A solution of 2 g. of sodium borohydride in 30 cc. of methanol was added with stirring to a solution of 2 g. of 2,2-difluoro-androstan-17β-ol-3-one in 40 cc. of tetrahydrofuran. The mixture was kept at room temperature overnight, the excess reagent was decomposed by addition of acetic acid, the resulting solution concentrated to small volume in vacuo and diluted with water. The product was extracted with ethyl acetate, the extract washed with water, dried and evaporated. Crystallization of the solid from acetone-hexane gave 2,2-difluoro-androstane-3β-17β-diol.

When applying this procedure to 2,2-difluoro-19-nor-androstan-17β-ol-3-one, there was obtained 2,2-difluoro-19-nor-androstan-3β,17β-diol.

Example III

To a solution of 1 g. of 2,2-difluoro-androstane-3β,17β-diol in 200 cc. of acetone at room temperature, there was added 60 cc. of freshly prepared chromous chloride solution. The reaction was virtually instantaneous. The acetone was then removed under reduced pressure, water was added and the precipitate filtered off and dried. Recrystallization from acetone-hexane yielded 2-fluoro-Δ²-androsten-17β-ol.

A mixture of 1 g. of 2,2-difluoro-androstane-3β,17β-diol, 2 g. of zinc and 50 cc. of ethanol was refluxed for 1 hour. The mixture was then filtered through celite and the filtrate evaporated to dryness. Crystallization of the residue from acetone-hexane yielded 2-fluoro-Δ²-androsten-17β-ol.

Following a second technique, 2,2-difluoro-19-nor-androstane-3β,17β-diol was treated by the same procedures affording 2-fluoro-19-nor-Δ²-androsten-17β-ol in each instance.

Example IV

A solution of 6 g. of 2-fluoro-Δ²-androsten-17β-ol obtained according to Example III, in 120 cc. of pyridine was added to a mixture of 6 g. of chromic trioxide in 120 cc. of pyridine. The reaction mixture was kept at room temperature overnight. It was then diluted with ethyl acetate, filtered through celite and the filtrate washed well with water, dried and evaporated to dryness. Crystallization from acetone-hexane afforded 2-fluoro-Δ²-androsten-17-one.

When applying the above procedure to 2-fluoro-19-nor-Δ²-androsten-17β-ol, there was obtained 2-fluoro-19-nor-Δ²-androsten-17-one.

Example V

A solution of 5 g. of androstan-17β-ol-3-one in 100 cc. of acetic acid was treated with a few drops of hydrogen bromide in acetic acid and subsequently dropwise and with stirring with a solution of 1.1 molar equivalents of bromine in 50 cc. of acetic acid. After all the bromine had been consumed, water was added, and the formed precipitate filtered, washed with water to neutral and dried under vacuum. Recrystallization from acetone-hexane yielded 2α-bromo-androstan-17β-ol-3-one.

19-nor-androstan-17β-ol-3-one was treated following the above procedure, thus affording 2α-bromo-19-nor-androstan-17β-ol-3-one.

Example VI

A mixture of 1.2 g. of 2α-bromo-androstan-17β-ol-3-one, 20 cc. of isopropenyl acetate and 60 mg. of paratoluenesulfonic acid was refluxed using an air condenser so that approximately 2 cc. of solvent distilled off over a period of 30 minutes.

A water-cooled condenser was then substituted for the air condenser and refluxing continued for 24 hours.

The cooled solution was diluted with ethyl acetate, washed with water, aqueous sodium bicarbonate, and then with water until neutral.

The organic solution was dried with sodium sulfate, evaporated to dryness, and the product crystallized from methylene chloride-hexane, thus furnishing 2-bromo-3,17β-diacetoxy-Δ²-androstene.

Upon treatment of 2α-bromo-19-nor-androstan-17β-ol-3-one by the above procedure, there was obtained 2-bromo-3,17β-diacetoxy-19-nor-Δ²-androstene.

Example VII

The solvent for this reaction is composed of 80 cc. of glacial acetic acid, 20 cc. of carbon tetrachloride and 1 g. of sodium acetate.

A stirred solution of 2.5 g. of 2-bromo-3,17β-diacetoxy-Δ²-androstene in 200 cc. of the solvent is treated dropwise in the course of 30 minutes at room temperature with a solution of 1.05 molar equivalents of bromine in solution of 20 cc. of the above solvent. It was then poured into water, extracted with methylene chloride and crystallized, thus yielding 2,2-dibromo-androstan-17β-ol-3-one-17-acetate.

When applying the above technique to 2-bromo-3,-17β-diacetoxy-19-nor-Δ²-androstene, there was obtained 2,2-dibromo-19-nor-androstan-17β-ol-3-one-17-acetate.

Example VIII

A solution of 1 g. of sodium borohydride in 3 cc. of water was added to an ice-cooled solution of 1 g. of 2,2-dibromo-androstan-17β-ol-3-one-17-acetate in 120 cc. of methanol and the mixture was allowed to stand for 16 hours at room temperature. The excess reagent was decomposed by addition of acetic acid, the solution concentrated to small volume in vacuo and diluted with water. The product was extracted with ethyl acetate, the extract was washed with water, dried and evaporated. The solid residue was purified by crystallization from acetone-hexane to give the 2,2-dibromo-androstane-3β,17β-diol.

2,2-dibromo-19-nor-androstan-17β-ol-3-one-17 - acetate was treated by the same technique furnishing 2,2-dibromo-19-nor-androstane-3β,17β-diol.

Example IX 2,2-dibromo-androstane-3β,17β-diol and 2,2-dibromo-19-nor-androstane-3β,17β-diol were treated following the techniques described in Example III, affording respectively 2-bromo-Δ²-androsten-17β-ol and 2-bromo-19-nor-Δ²-androsten-17β-ol.

Example X

The two last named compounds were oxidized following the procedure described in Example IV, furnishing correspondingly 2-bromo-$\Delta^2$-androsten-17-one and 2-bromo-19-nor-$\Delta^2$-androsten-17-one.

Example XI

A mixture of 4 g. of androstan-17$\beta$-ol-2-one acetate (obtained in accordance with copending U.S. Patent Application Serial No. 128,362 filed August 1, 1961), 6 g. of phosphorus pentachloride and 60 cc. of carbon tetrachloride was refluxed for 2 hours in the absence of moisture. It was then cautiously poured into water. The organic layer was washed several times with water, dried over sodium sulfate and evaporated to dryness furnishing 2-chloro-$\Delta^2$-androsten-17$\beta$-ol acetate.

Example XII 19-nor-androstan-17$\beta$-ol-2-one acetate was obtained following the process described in copending application Serial No. 128,362 for the production of androstan-17$\beta$-ol-2-one acetate:

The starting compound which is the dihydro-19-nor-allotestosterone was borminated in the presence of hydrogen bromide giving 2$\alpha$-bromo-19-nor-androstan-17$\beta$-ol-3-one. Reduction of this compound with sodium borohydride yielded 2$\alpha$-bromo-19-nor-androstane-3$\beta$,17$\beta$-diol which on treatment with zinc in acetic acid at reflux temperature afforded 19-nor-$\Delta^2$-androsten-17$\beta$-ol. Conventinal acetylation of this compound furnished the 19-nor-$\Delta^2$-androsten-17$\beta$-ol-17-acetate. Treatment of the last named compound with N-bromoacetamide in dioxane and in the presence of perchloric acid afforded 3$\alpha$-bromo-19-nor-androstane-2$\beta$,17$\beta$-diol-17-acetate.

This last compound was oxidized with chromium trioxide in pyridine and furnished 3$\alpha$-bromo-19-nor-androstan-17$\beta$-ol-2-one-17-acetate which upon treatment with zinc in acetic acid gave 19-nor-androstan-17$\beta$-ol-2-one-17-acetate. Conventional saponification of the last named steroid afforded 19-nor-androstan-17$\beta$-ol-2-one which upon conventional acetylation gave 19-nor-androstan-17$\beta$-ol-2-one acetate.

This latter compound was treated following the procedure described in Example XI, thus furnishing 2-chloro-19-nor-$\Delta^2$-androsten-17$\beta$-ol-acetate.

Example XIII

A solution of 3 g. of 2-chloro-$\Delta^2$-androsten-17$\beta$-ol-acetate in 150 cc. of methanol was refluxed for 1 hour with 3 g. of potassium carbonate in 6 cc. of water. It was then cooled and poured into water. The formed precipitate was collected, dried and recrystallized from acetone-hexane to yield 2-chloro-$\Delta^2$-androsten-17$\beta$-ol.

2-chloro-19-nor-$\Delta^2$-androsten-17$\beta$-ol-acetate was treated by the same technique yielding 2-chloro-19-nor-$\Delta^2$-androsten-17$\beta$-ol.

Example XIV 2-chloro-$\Delta^2$-androsten-17$\beta$-ol and 2-chloro-19-nor-$\Delta^2$-androsten-17$\beta$-ol were oxidized by the method described in Example IV affording respectively 2-chloro-$\Delta^2$-androsten-17-one and 2-chloro-19-nor-$\Delta^2$-androsten-17-one.

Example XV

A solution of 5 g. of 2-fluoro-$\Delta^2$-androsten-17-one in 250 cc. of thiophene-free benzene was treated with 27.5 cc. of 4 N methylmagnesium bromide in ether, and the mixture refluxed with the exclusion of moisture for 3 hours. The cooled mixture was cautiously treated with excess aqueous ammonium chloride solution and the product isolated by ethyl acetate extraction. The extract was wased with water, dried over anhydrous sodium sulfate and evaporated to dryness.

Recrystallization from methylene chloride-hexane afforded 2-fluoro-17$\alpha$-methyl-$\Delta^2$-androsten-17$\beta$-ol.

Following the above procedure, there were treated the starting compounds listed below with the indicated akyl, alkenyl or alkinyl magnesium bromide affording the corresponding products, hereinafter set forth:

| Starting compound | Grignard reagent | Product |
|---|---|---|
| 2-fluoro-$\Delta^2$-androsten-17-one. | vinyl magnesium bromide. | 2-fluoro-17$\alpha$-vinyl-$\Delta^2$-androsten-17$\beta$-ol. |
| Do | ethynyl magnesium bromide. | 2-fluoro-17$\alpha$-ethynyl-$\Delta^2$-androsten-17$\beta$-ol. |
| 2-fluoro-19-nor-$\Delta^2$-androsten-17-one. | methyl magnesium bromide. | 2-fluoro-17$\alpha$-methyl-19-nor-$\Delta^2$-androsten-17$\beta$-ol. |
| Do | vinyl magnesium bromide. | 2-fluoro-17$\alpha$-vinyl-19-nor-$\Delta^2$-androsten-17$\beta$-ol. |
| Do | ethynyl magnesium bromide. | 2-fluoro-17$\alpha$-ethynyl-19-nor-$\Delta^2$-androsten-17$\beta$-ol. |
| 2-chloro-$\Delta^2$-androsten-17-one. | methyl magnesium bromide. | 2-chloro-17$\alpha$-methyl-$\Delta^2$-androsten-17$\beta$-ol. |
| Do | vinyl magnesium bromide. | 2-chloro-17$\alpha$-vinyl-$\Delta^2$-androsten-17$\beta$-ol. |
| Do | ethynyl magnesium bromide. | 2-chloro-17$\alpha$-ethynyl-$\Delta^2$-androsten-17$\beta$-ol. |
| 2-chloro-19-nor-$\Delta^2$-androsten-17-one. | methyl magnesium bromide. | 2-chloro-17$\alpha$-methyl-19-nor-$\Delta^2$-androsten-17$\beta$-ol. |
| Do | vinyl magnesium bromide. | 2-chloro-17$\alpha$-vinyl-19-nor-$\Delta^2$-androsten-17$\beta$-ol. |
| Do | ethynyl magnesium bromide. | 2-chloro-17$\alpha$-ethynyl-19-nor-$\Delta^2$-androsten-17$\beta$-ol. |
| 2-bromo-$\Delta^2$-androsten-17-one. | methyl magnesium bromide. | 2-bromo-17$\alpha$-methyl-$\Delta^2$-androsten-17$\beta$-ol. |
| Do | vinyl magnesium bromide. | 2-bromo-17$\alpha$-vinyl-$\Delta^2$-androsten-17$\beta$-ol. |
| Do | ethynyl magnesium bromide. | 2-bromo-17$\alpha$-ethynyl-$\Delta^2$-androsten-17$\beta$-ol. |
| 2-bromo-19-nor-$\Delta^2$-androsten-17-one. | methyl magnesium bromide. | 2-bromo-17$\alpha$-methyl-19-nor-$\Delta^2$-androsten-17$\beta$-ol. |
| Do | vinyl magnesium bromide. | 2-bromo-17$\alpha$-vinyl-19-nor-$\Delta^2$-androsten-17$\beta$-ol. |
| Do | ethynyl magnesium bromide. | 2-bromo-17$\alpha$-ethynyl-19-nor-$\Delta^2$-androsten-17$\beta$-ol. |

Example XVI

A mixture of 1 g. of 2-fluoro-$\Delta^2$-androsten-17$\beta$-ol, 4 cc. of pyridine and 2 cc. of acetic anhydride was kept at room temperature overnight, poured into ice water and the formed precipitate was filtered, washed with water and dried. Crystallization from acetone-hexane gave the 17-acetate of 2-fluoro-$\Delta^2$-androsten-17$\beta$-ol.

When applying the above technique to 2-fluoro-19-nor-$\Delta^2$-androsten-17$\beta$-ol, 2-chloro-$\Delta^2$-androsten-17$\beta$-ol, 2-chloro-19-nor-$\Delta^2$-androsten-17$\beta$-ol, 2-bromo-$\Delta^2$-androsten-17$\beta$-ol, and 2-bromo-19-nor-$\Delta^2$-androsten-17$\beta$-ol, there were obtained 2-fluoro-19-nor-$\Delta^2$-androsten-17$\beta$-ol-acetate, 2-chloro-$\Delta^2$-androsten-17$\beta$-ol-acetate, 2-chloro-19-nor-$\Delta^2$-androsten-17$\beta$-ol acetate, 2-bromo-$\Delta^2$-androsten-17$\beta$-ol-acetate, and 2-bromo-19-nor-$\Delta^2$-androsten-17$\beta$-ol-acetate.

Example XVII

Following the technique of the foregoing example, but substituting acetic anhydride by propionic anhydride, caproic anhydride, cyclopentylpropionic anhydride and benzoyl chloride, there were correspondingly obtained the propionates, caproates, cyclopentylpropionates, and benzoates of the named starting compounds.

Example XVIII

A mixture of 1 g. 2-fluoro-17$\alpha$-methyl-$\Delta^2$-androsten-17$\beta$-ol, 1 g. of p-toluenesulfonic acid monohydrate, 50 cc. of acetic acid and 25 cc. of acetic anhydride was kept at room temperature for 24 hours. It was then poured into water and stirred until the excess of anhydride had hydrolyzed. Isolation of the product by methylene chloride extraction and crystallization of the residue from acetone ether gave 2-fluoro-17$\alpha$-methyl-$\Delta^2$-androsten-17$\beta$-ol-17-acetate.

The starting compounds listed below were treated by the above described technique furnishing the corresponding products set forth hereinafter:

| Starting compounds | Products |
|---|---|
| 2-fluoro-17α-vinyl-Δ²-androsten-17β-ol. | 17-acetate of 2-fluoro-17α-vinyl-Δ²-androsten-17β-ol. |
| 2-fluoro-17α-ethynyl-Δ²-androsten-17β-ol. | 17-acetate of 2-fluoro-17α-ethynyl-Δ²-androsten-17β-ol. |
| 2-fluoro-17α-methyl-19-nor-Δ²-androsten-17β-ol. | 17-acetate of 2-fluoro-17α-methyl-19-nor-Δ²-androsten-17β-ol. |
| 2-fluoro-17α-vinyl-19-nor-Δ²-androsten-17β-ol. | 17-acetate of 2-fluoro-17α-vinyl-19-nor-Δ²-androsten-17β-ol. |
| 2-fluoro-17α-ethynyl-19-nor-Δ²-androsten-17β-ol. | 17-acetate of 2-fluoro-17α-ethynyl-19-nor-Δ²-androsten-17β-ol. |
| 2-chloro-17α-methyl-Δ²-androsten-17β-ol. | 17-acetate of 2-chloro-17α-methyl-Δ²-androsten-17β-ol. |
| 2-chloro-17α-vinyl-Δ²-androsten-17β-ol. | 17-acetate of 2-chloro-17α-vinyl-Δ²-androsten-17β-ol. |
| 2-chloro-17α-ethynyl-Δ²-androsten-17β-ol. | 17-acetate of 2-chloro-17α-ethynyl-Δ²-androsten-17β-ol. |
| 2-chloro-17α-methyl-19-nor-Δ²-androsten-17β-ol. | 17-acetate of 2-chloro-17α-methyl-19-nor-Δ²-androsten-17β-ol. |
| 2-chloro-17α-vinyl-19-nor-Δ²-androsten-17β-ol. | 17-acetate of 2-chloro-17α-vinyl-19-nor-Δ²-androsten-17β-ol. |
| 2-chloro-17α-ethynyl-19-nor-Δ²-androsten-17β-ol. | 17-acetate of 2-chloro-17α-ethynyl-19-nor-Δ²-androsten-17β-ol. |
| 2-bromo-17α-methyl-Δ²-androsten-17β-ol. | 17-acetate of 2-bromo-17α-methyl-Δ²-androsten-17β-ol. |
| 2-bromo-17α-vinyl-Δ²-androsten-17β-ol. | 17-acetate of 2-bromo-17α-vinyl-Δ²-androsten-17β-ol. |
| 2-bromo-17α-ethynyl-Δ²-androsten-17β-ol. | 17-acetate of 2-bromo-17α-ethynyl-Δ²-androsten-17β-ol. |
| 2-bromo-17α-methyl-19-nor-Δ²-androsten-17β-ol. | 17-acetate of 2-bromo-17α-methyl-19-nor-Δ²-androsten-17β-ol. |
| 2-bromo-17α-vinyl-19-nor-Δ²-androsten-17β-ol. | 17-acetate of 2-bromo-17α-vinyl-19-nor-Δ²-androsten-17β-ol. |
| 2-bromo-17α-ethynyl-19-nor-Δ²-androsten-17β-ol. | 17-acetate of 2-bromo-17α-ethynyl-19-nor-Δ²-androsten-17β-ol. |

*Example XIX*

Following the technique of Example XVIII except that acetic anhydride was substituted by propionic anhydride, caproic anhydride and cyclopentylpropionic anhydride, there were respectively obtained the 17-propionates, 17-caproates and 17-cyclopentylpropionates of the starting compounds named in the same example.

We claim:
1. A compound of the following formula:

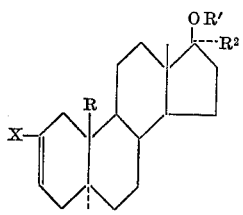

wherein X is a member of the group consisting of fluorine, chlorine and bromine; R is selected from the group consisting of hydrogen and methyl; $R^1$ is selected from the group consisting of hydrogen and a hydrocarbon carboxylic acyl group of less than 12 carbon atoms; and $R^2$ is selected from the group consisting of hydrogen, lower alkyl, lower alkenyl and lower alkinyl.

2. 2-fluoro-Δ²-androsten-17β-ol.
3. 2-fluoro-19-nor-Δ²-androsten-17β-ol.
4. 2-chloro-Δ²-androsten-17β-ol.
5. 2-chloro-19-nor-Δ²-androsten-17β-ol.
6. 2-bromo-Δ²-androsten-17β-ol.
7. 2-bromo-19-nor-Δ²-androsten-17β-ol.
8. 2-fluoro-17α-methyl-Δ²-androsten-17β-ol.
9. 2-fluoro-17α-methyl-19-nor-Δ²-androsten-17β-ol.
10. 2-fluoro-17α-vinyl-Δ²-androsten-17β-ol.
11. 2-fluoro-17α-vinyl-19-nor-Δ²-androsten-17β-ol.
12. 2-fluoro-17α-ethynyl-Δ²-androsten-17β-ol.
13. 2-fluoro-17α-ethynyl-19-nor-Δ²-androsten-17β-ol.
14. 2-chloro-17α-methyl-Δ²-androsten-17β-ol.
15. 2-chloro-17α-vinyl-19-nor-Δ²-androsten-17β-ol.
16. 2-chloro-17α-ethynyl-19-nor-Δ²-androsten-17β-ol.
17. 2-bromo-17α-methyl-Δ²-androsten-17β-ol.
18. 2-bromo-17α-vinyl-19-nor-Δ²-androsten-17β-ol.
19. 2-bromo-17α-ethynyl-19-nor-Δ²-androsten-17β-ol.
20. A process for the production of 2-chloro-Δ²-androstene derivatives which comprises treating the corresponding androstan-2-one with phosphorus pentachloride in a suitable solvent.
21. The process of claim 20 wherein the solvent is carbon tetrachloride.
22. A compound of the following formula:

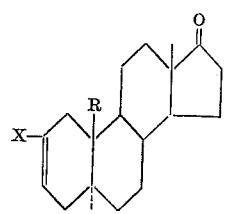

wherein X is a member of the group consisting of fluorine, chlorine, and bromine and R is selected from the group consisting of hydrogen and methyl.

23. 2,2-difluoro-androstan-17β-ol-3-one.
24. 2,2-difluoro-19-nor-androstan-17β-ol-3-one.
25. 2,2-difluoro-19-nor-androstane-3β,17β-diol.
26. 2,2-difluoro-androstane-3β,17β-diol.

No references cited.